US008761926B2

(12) United States Patent
Zaier (10) Patent No.: US 8,761,926 B2
(45) Date of Patent: Jun. 24, 2014

(54) APPARATUS AND METHOD FOR ROBOT CONTROL

(75) Inventor: Riadh Zaier, Al Khod (OM)

(73) Assignee: Fujitsu Limited, Kawasaki (JP)

(*) Notice: Subject to any disclaimer, the term of this patent is extended or adjusted under 35 U.S.C. 154(b) by 247 days.

(21) Appl. No.: 12/659,897

(22) Filed: Mar. 24, 2010

(65) Prior Publication Data

US 2010/0286822 A1 Nov. 11, 2010

Related U.S. Application Data

(63) Continuation of application No. PCT/JP2007/068581, filed on Sep. 25, 2007.

(51) Int. Cl.
*G06F 19/00* (2011.01)
*G05B 15/00* (2006.01)

(52) U.S. Cl.
USPC .......... 700/245; 700/1; 700/23; 700/247; 700/248; 700/250

(58) Field of Classification Search
None
See application file for complete search history.

(56) References Cited

U.S. PATENT DOCUMENTS

| 5,838,130 | A * | 11/1998 | Ozawa | 318/568.2 |
|---|---|---|---|---|
| 6,493,606 | B2 * | 12/2002 | Saijo et al. | 700/245 |
| 7,072,741 | B2 * | 7/2006 | Nagashima | 700/245 |
| 7,319,917 | B2 * | 1/2008 | Takenaka et al. | 700/245 |
| 7,949,428 | B2 * | 5/2011 | Endo et al. | 700/245 |
| 2004/0133308 | A1 * | 7/2004 | Kato et al. | 700/245 |
| 2005/0113973 | A1 * | 5/2005 | Endo et al. | 700/245 |
| 2005/0119791 | A1 * | 6/2005 | Nagashima | 700/253 |
| 2005/0126833 | A1 * | 6/2005 | Takenaka et al. | 180/8.1 |
| 2005/0240307 | A1 * | 10/2005 | Kuroki et al. | 700/245 |
| 2006/0184276 | A1 * | 8/2006 | Takenaka et al. | 700/245 |
| 2007/0145930 | A1 * | 6/2007 | Zaier | 318/568.12 |
| 2008/0133057 | A1 * | 6/2008 | Hasegawa | 700/258 |
| 2008/0223138 | A1 * | 9/2008 | Kurihara | 73/649 |
| 2009/0089001 | A1 * | 4/2009 | Lin | 702/92 |
| 2010/0070076 | A1 * | 3/2010 | Zaier | 700/245 |
| 2012/0010772 | A1 * | 1/2012 | Pack et al. | 701/27 |

FOREIGN PATENT DOCUMENTS

| JP | 2004-17187 | 1/2004 |
|---|---|---|
| JP | 2004-167666 | 6/2004 |
| JP | 2005-96068 | 4/2005 |
| JP | 2006-175567 | 7/2006 |
| JP | 2007-175809 | 7/2007 |
| JP | 2008-534304 | 8/2008 |
| WO | 2006/105420 A2 | 10/2006 |

OTHER PUBLICATIONS

Recurrent Neural Network language for Robot Learning, Proceeding of the 20th annual conference of the robotics society of japan, Oct. 12-14, 2004,Osaka, Japan.*

(Continued)

*Primary Examiner* — Ian Jen
(74) *Attorney, Agent, or Firm* — Staas & Halsey LLP (57) ABSTRACT

A robot control method for controlling robot walking includes: generating control information, based on a plurality of postures corresponding to different points of time and at least including a reference posture when a robot is independently standing without falling down, and controlling the robot so that the robot performs a predetermined walking motion; and determining whether a value of a gyro index is larger than a predetermined threshold value, during the controlling of the robot, and, when the value of the gyro index is larger than the predetermined threshold value, performs a reflex control processing.

6 Claims, 11 Drawing Sheets

(56) References Cited

OTHER PUBLICATIONS

Neural Locomotion controller design and implementation for humanoid robot HOAP-1, Proceeding of the 20th annual conference of the robotics society of japan, Oct. 12-14, 2002, Osaka, Japan.*

Motion Generation of Humanoid Robot based on Polynomials generated by Recurrent neural network, proceedings of the first asia international symposium of mechatronics, Sep. 27-30, 2004.*

International Search Report for PCT/JP2007/068581, mailed on Nov. 6, 2007.

Japanese Office Action dated Nov. 29, 2011 issued in corresponding Japanese Patent Application No. 2009-534076.

Riadh Zaier, "Experimental Study of Sensory Reflex for Humanoid Robots: Activation and Stability Issues", Proceedings of the $25^{th}$ Annual Conference of the Robotics Society of Japan, Sep. 13-15, 2007, 3H16.

Riadh Zaier "Reflex System for Humanoid Robots against Large Disturbances", Proceedings of the $24^{th}$ Annual Conference of the Robotics Society of Japan, Sep. 14-16, 2006, 2H24.

Riadh Zaier et al., "Piecewise-Linear Pattern Generator and Reflex System for Humanoid Robots," Proceedings to the 2007 IEEE International Conference on Robotics and Automation, Apr. 10-14, 2007, pp. 2188-2195.

Riadh Zaier et al., "Motion Pattern Generator and Reflex System for Humanoid Robots", Proceedings to the 2006 IEEE/RSJ International Conference on Intelligent Robots and Systems, Oct. 9-15, 2006, pp. 840-845.

* cited by examiner

FRONT SIDE OF RIGHT LEG

WALKING DIRECTION

10 cm 6 cm

ZMP WHEN STANDING ON ONE LEG

FORCE SENSOR

FIG.8

$$y_m = (y_1(F_3+F_4) + y_2(F_1+F_2))/\sum_{i=1}^{4} F_i$$

$$x_m = (x_1(F_2+F_4) + x_2(F_1+F_3))/\sum_{i=1}^{4} F_i$$

APPARATUS AND METHOD FOR ROBOT CONTROL

CROSS-REFERENCE TO RELATED APPLICATION(S)

This application is a continuation of International Application No. PCT/JP2007/068581, filed on Sep. 25, 2007, the entire contents of which are incorporated herein by reference.

FIELD

The embodiments discussed herein are directed to a robot control apparatus, a robot control method, and a robot control program for controlling the walking of a robot.

BACKGROUND

In recent years, humanoid robots, particularly the walking of humanoid robots has been drawing attention of many researchers. The majority of researches regarding humanoid robot walking uses zero moment point (ZMP), and controls the ZMP to keep the ZMP inside the supporting polygon. In this approach, a humanoid robot and the surrounding environment of the robot are accurately modeled and differential equations are solved. However, the modeling becomes difficult if there is an unknown element. Moreover, since solving differential equation consumes time, it is difficult to perform real-time control.

Another approach does not use the ZMP. For example, one conventional technology makes use of a periodic motion of moveable parts of a robot and adjusts the phase of the periodic motion so that the posture of the robot remains stable (see Japanese Laid-open Patent Publication No. 2005-96068). Here, the movable parts indicate the legs and arms of a robot.

Moreover, Japanese Laid-open Patent Publication No. 2007-175809 discloses a technology that efficiently controls the robot so as to allow the humanoid robot to stably perform various motions while eliminating the need of modeling a humanoid robot or the surrounding environment thereof.

The conventional technologies, however, are not immune from the problems. Specifically, when an external force is applied to the upper body of a walking robot, the robot cannot continue the periodic motion and the conventional technologies cannot control the robot.

SUMMARY

According to an aspect of the invention, a robot control method for controlling robot walking includes: generating control information, based on a plurality of postures corresponding to different points of time and at least including a reference posture when a robot is independently standing without falling down, and controlling the robot so that the robot performs a predetermined walking motion; and determining whether a value of a gyro index is larger than a predetermined threshold value, during the controlling of the robot, and, when the value of the gyro index is larger than the predetermined threshold value, performs a reflex control processing.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

Figure 1:
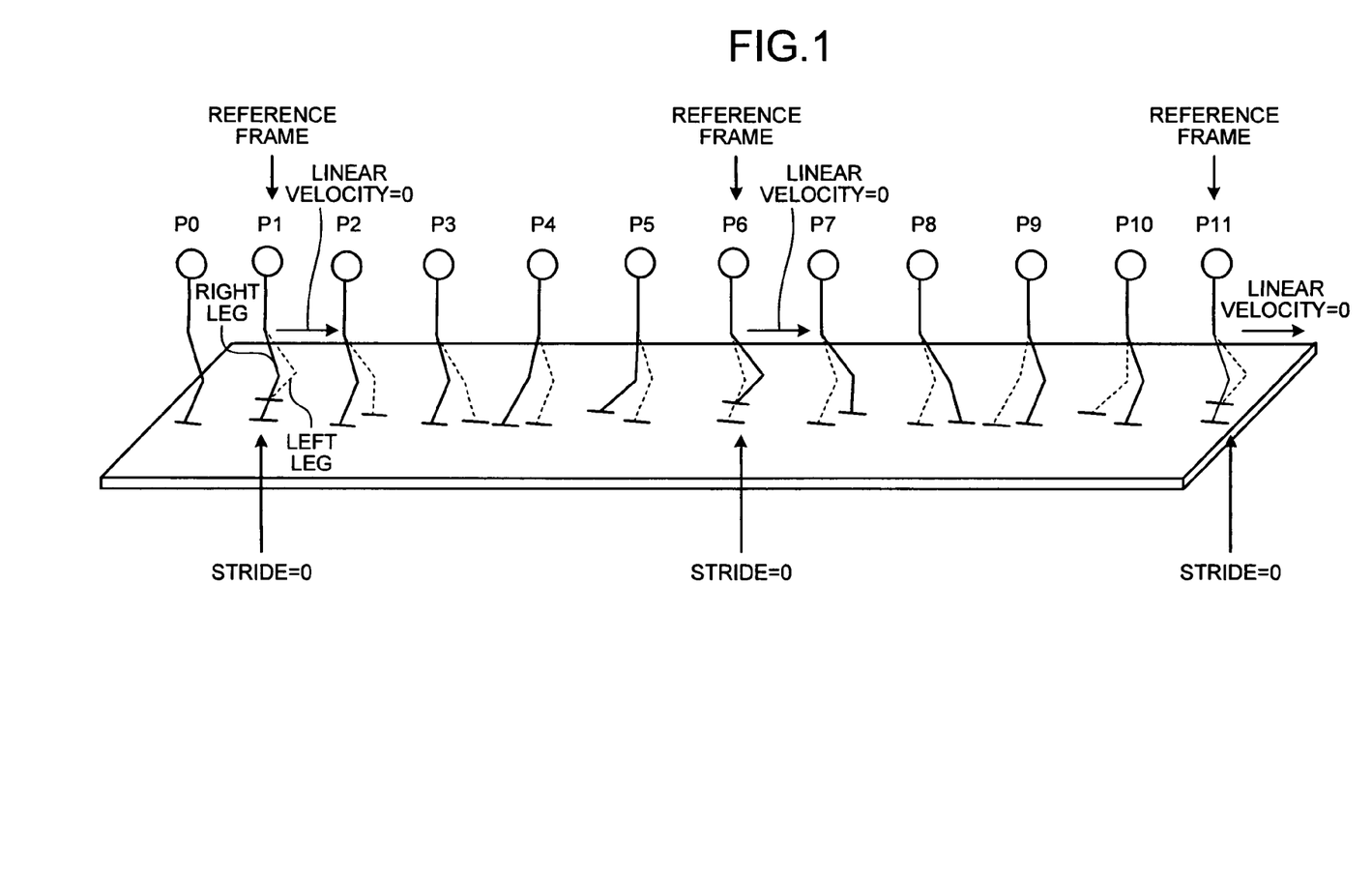
FIG. 1 is an explanatory diagram for explaining robot walking according to the present embodiment.

FIG. 1 is an explanatory diagram for explaining robot walking according to the present embodiment. In FIG. 1, the right leg of the robot is represented with a solid line and the left leg thereof is represented with a dotted line. Moreover, in a robot control apparatus, a plurality of frames Pi is set in advance. Frames define various postures of the robot during walking. To be precise, the frames define parameters such as angles of the joints of the robot.

As illustrated in FIG. 1, twelve frames from P0 to P11 are set. However, the number of frames can be determined in an arbitrary manner. The frame P0 represents a pre-walking posture when the robot is independently standing without falling down. The frames P1, P6, and P11 represent a posture when the robot is independently standing still without falling down.

It is assumed that, in the frame P6, the robot has zero linear velocity and is standing only on the left foot with zero stride length. In the frames P1 and P11, the robot is in the same condition. That is, in the frames P1 and P11, the robot has zero linear velocity and is standing only on the right foot with zero stride length. The zero stride length indicates that two legs of the robot are aligned. Since the robot is standing independently with zero stride length in the frames P1, P6, and P11, those frames are hereinafter referred to as reference frames.

The changeover from one frame to another is performed by interpolating the postures of all intervening frames. Apart from the reference postures, the posture in each frame is a loosely-defined posture and is appropriately corrected to ensure stable walking of the robot.

Figure 2:
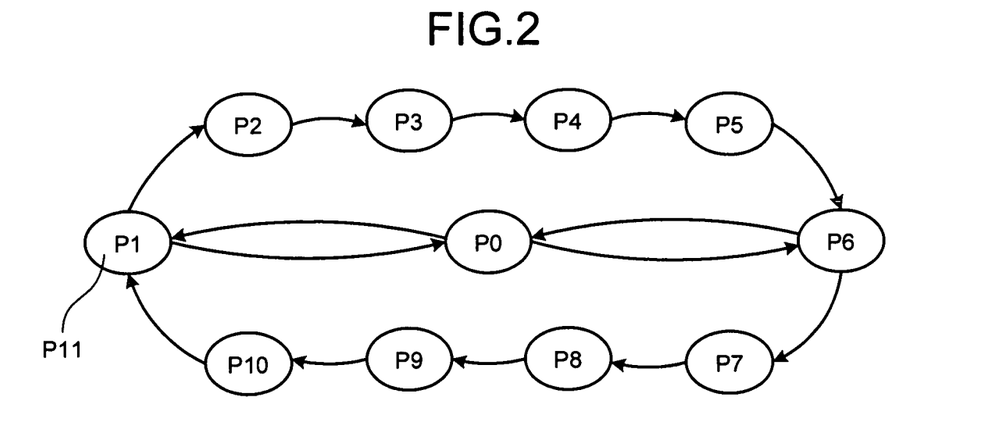
FIG. 2 is a state transition diagram of each of a plurality of frames P0 to P11.

FIG. 2 is a state transition diagram of each of the frames P0 to P11. From the frame P0, the condition of the robot transits to the reference frame P1 (same as the reference frame P11) or the reference frame P6. On the other hand, the condition of the robot can also transit from the reference frame P1 or the reference frame P6 to the frame P0. In the example illustrated in FIG. 1, firstly, the condition of the robot transits from the frame P0 to the reference frame P1. Subsequently, the condition of the robot transits to the reference frame P11 via the frames P2 to P10.

Thus, while controlling the condition of the robot, frame information is obtained that includes information on the reference frames P1, P6, and P11 in which the robot is independently standing without falling down. Then, the posture of the robot is interpolated between the frames P0 to P11 so that the motion of the robot leads to the posture in the reference frames P1, P6, and P11. As a result, even if the robot takes an unstable posture, it returns to a stable posture in the reference frames. For that reason, the robot can continue to perform the walking motion in a stable manner.

Meanwhile, in the reference frames P6 and P11, the robot is in a stationary posture while stably standing. That makes it easier to change the stride length of the subsequent walking, change the subsequent walking direction, or start a motion other than walking.

Figure 3:
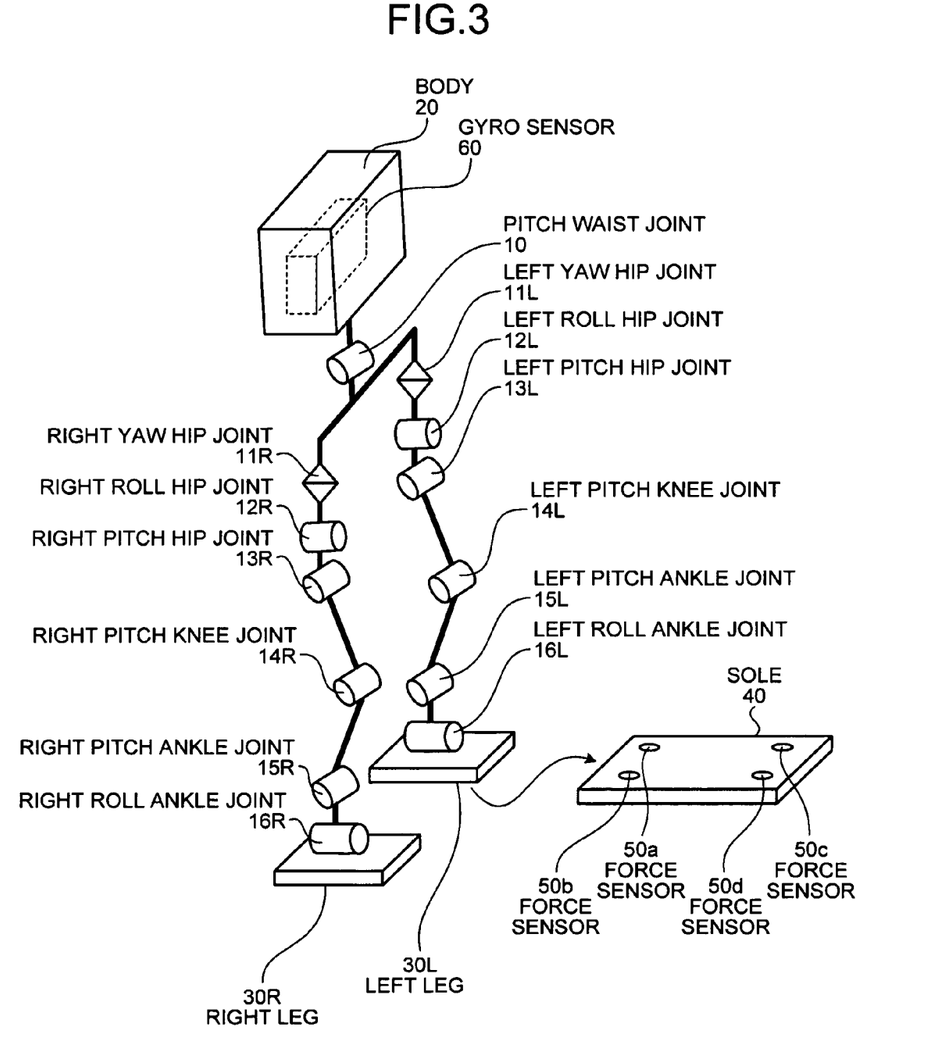
FIG. 3 is a schematic diagram of a robot according to the present embodiment.

FIG. 3 is a schematic diagram of a robot according to the present embodiment. The robot includes a body 20; a gyro sensor 60 installed in the body 20; and two legs, namely, a right leg 30R and a left leg 30L, each of which has six joints. Thus, each leg has a degree of freedom equal to six. Meanwhile, the number of joints can be determined in an arbitrary manner.

The joints include a pitch waist joint 10, a right yaw hip joint 11R, a left yaw hip joint 11L, a right roll hip joint 12R, a left roll hip joint 12L, a right pitch hip joint 13R, a left pitch hip joint 13L, a right pitch knee joint 14R, a left pitch knee joint 14L, a right pitch ankle joint 15R, a left pitch ankle joint 15L, a right roll ankle joint 16R, and a left roll ankle joint 16L. In each joint is embedded a motor (not illustrated) that controls the motion of the corresponding joint. Besides, in each joint is embedded a position sensor (not illustrated) that detects the motion, more particularly, the rotation angle of the corresponding joint.

The pitch waist joint 10 controls the front-back motion (pitching) of the body 20. The right yaw hip joint 11R and the left yaw hip joint 11L cause the left-right rotating motion (yawing) of the robot at the base portion of the respective legs.

The right roll hip joint 12R and the left roll hip joint 12L cause the sideways rotation (rolling) of the robot at the base portion of the respective legs. The right pitch hip joint 13R and the left pitch hip joint 13L cause the front-back motion (pitching) of the robot at the base portion of the respective legs.

The right pitch knee joint 14R and the left pitch knee joint 14L cause the front-back motion (pitching) of the robot at the respective knee portions. The right pitch ankle joint 15R and the left pitch ankle joint 15L cause the front-back motion (pitching) of the robot at the respective ankle portions. The right roll ankle joint 16R and the left roll ankle joint 16L cause the sideways rotation (rolling) of the robot at the respective ankle portions.

Meanwhile, to each leg is attached a sole. In FIG. 3, a sole 40 attached to the left leg 30L is illustrated. In each sole are embedded four force sensors. However, the number of force sensors can be determined in an arbitrary manner. In FIG. 3, force sensors 50a to 50d embedded in the sole 40 are illustrated. The force sensors 50a to 50d measure the reaction force experienced by the sole 40 from the floor surface. The reaction force measured by the force sensors 50a to 50d is used in performing compliance control processing and feedback control processing of the motions made by the robot.

The gyro sensor 60 measures the rotation angles of the body 20 in the sideways (rolling) direction and the front-back (pitching) direction. The rotation angles measured by the gyro sensor 60 are used in performing the feedback control processing of the motions made by the robot.

Figure 4:
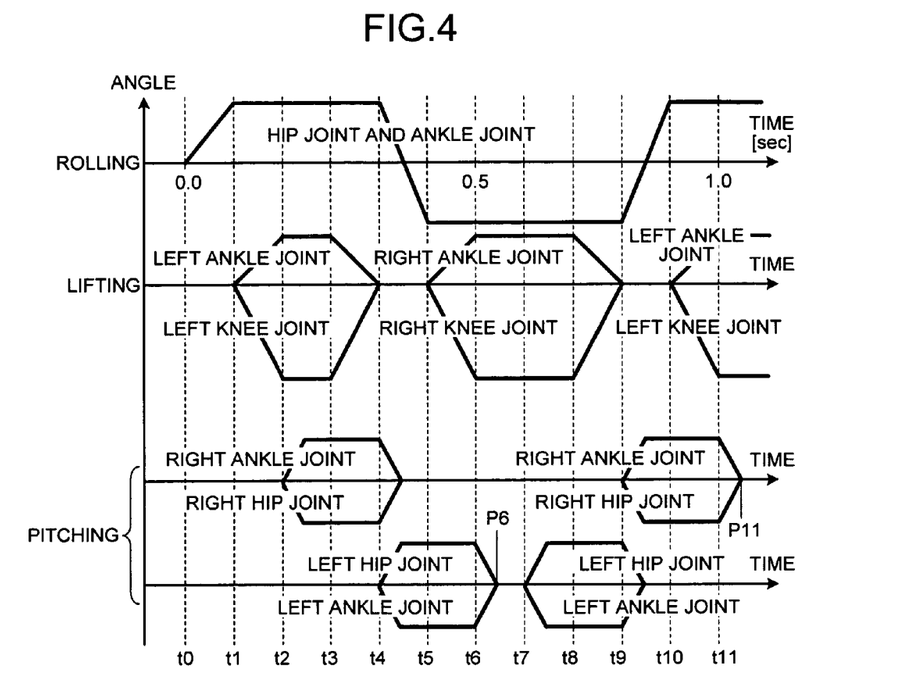
FIG. 4 is a time chart for explaining the walking motion of the robot.

FIG. 4 is a time chart for explaining the walking motion of the robot. At time t0; the right roll hip joint 12R, the left roll hip joint 12L, the right roll ankle joint 16R, and the left roll ankle joint 16L perform the rolling motion to tilt both legs toward the right side of the robot so that the left leg is lifted. At the time of performing such rolling motion; the movements of the right roll hip joint 12R, the left roll hip joint 12L, the right roll ankle joint 16R, and the left roll ankle joint 16L differ by only a slight margin equal to the gear backlash compensation.

The amplitude of the rolling motion is determined by trial and error. Alternatively, the amplitude of the rolling motion is determined by performing the feedback control processing in order to minimize an evaluation function of the rolling angle of the body 20.

At time t1, the right roll hip joint 12R, the left roll hip joint 12L, the right roll ankle joint 16R, and the left roll ankle joint 16L stop the rolling motion. Then, to lift the left leg, that is, to perform the lifting operation on the left leg; the left pitch knee joint 14L rotates the left leg in a contracting manner and the left pitch ankle joint 15L rotates the left ankle in a contracting manner.

At time t2, the left pitch knee joint 14L and the left pitch ankle joint 15L stop the lifting motion. Then, the right pitch hip joint 13R and the right pitch ankle joint 15R rotate and perform the pitching motion so that the body 20 moves in the anterior direction.

Between time t2 and time t3, the right pitch hip joint 13R and the right pitch ankle joint 15R stop the pitching motion.

At time t3, the left pitch knee joint 14L rotates to extend the left leg so that the left foot lands on the floor surface; while the left pitch ankle joint 15L rotates to extend the left ankle.

At time t4, the left foot lands on the floor surface. Besides, the right roll hip joint 12R, the left roll hip joint 12L, the right roll ankle joint 16R, and the left roll ankle joint 16L perform the rolling motion to tilt both legs toward the left side of the robot so that the right leg is lifted. Moreover, the right pitch hip joint 13R and the right pitch ankle joint 15R rotate to return to the original condition, that is, to the condition at time t2. Furthermore, to draw the right leg in front, the left pitch hip joint 13L and the left pitch ankle joint 15L rotate and perform the pitching motion so that the body 20 moves in the anterior direction.

Between time t4 and time t5, the right pitch hip joint 13R and the right pitch ankle joint 15R return to the original condition; while the left pitch hip joint 13L and the left pitch ankle joint 15L stop the pitching motion.

At time t5, the right roll hip joint 12R, the left roll hip joint 12L, the right roll ankle joint 16R, and the left roll ankle joint 16L stop the rolling motion. Then, to lift the right leg, that is, to perform the lifting operation on the right leg; the right pitch knee joint 14R rotates the right leg in a contracting manner and the right pitch ankle joint 15R rotates the right ankle in a contracting manner.

At time t6, the right pitch knee joint 14R and the right pitch ankle joint 15R stop the lifting motion. In addition, the left pitch hip joint 13L and the left pitch ankle joint 15L rotate to return to the original condition, that is, to the condition at time t4. As a result, the posture of the robot gets set to the posture defined in the reference frame P6.

Between time t6 and time t7, the left pitch hip joint 13L and the left pitch ankle joint 15L return to the original condition. As a result, the posture of the robot gets set to the posture defined in the reference frame P6. Thus, the robot has zero linear velocity and is standing only on the left foot with zero stride length.

At time t7, to draw the right leg in front, the left pitch hip joint 13L and the left pitch ankle joint 15L rotate and perform the pitching motion so that the body 20 moves in the anterior direction.

Between time t7 and time t8, the left pitch hip joint 13L and the left pitch ankle joint 15L stop the pitching motion. At time t8, the right pitch knee joint 14R rotates to extend the right leg so that the right foot lands on the floor surface; while the right pitch ankle joint 15R rotates to extend the right ankle.

At time t9, the right foot lands on the floor surface. Besides, the right roll hip joint 12R, the left roll hip joint 12L, the right roll ankle joint 16R, and the left roll ankle joint 16L perform the rolling motion to tilt both the legs toward the right side of the robot so that the left leg is lifted. Moreover, to draw the left leg in front, the right pitch hip joint 13R and the right pitch ankle joint 15R rotate and perform the pitching motion so that the body 20 moves in the anterior direction. Furthermore, the left pitch hip joint 13L and the left pitch ankle joint 15L rotate to return to the original condition, that is, to the condition at time t7.

At time t10, the right roll hip joint 12R, the left roll hip joint 12L, the right roll ankle joint 16R, and the left roll ankle joint 16L stop the rolling motion. Then, to lift the left leg, that is, to perform the lifting operation on the left leg; the left pitch knee joint 14L rotates the left leg in a contracting manner and the left pitch ankle joint 15L rotates the left ankle in a contracting manner.

At time t11, the left pitch knee joint 14L and the left pitch ankle joint 15L stop the lifting motion. Moreover, the right pitch hip joint 13R and the right pitch ankle joint 15R rotate to return to the original condition, that is, to the condition at time t9. As a result, the posture of the robot gets set to the posture defined in the reference frame P11.

After time t11, the right pitch hip joint 13R and the right pitch ankle joint 15R return to the original condition. As a result, the posture of the robot gets set to the posture defined in the reference frame P11. Thus, the robot has zero linear velocity and is standing only on the left foot with zero stride length. By repeating the abovementioned movements, it becomes possible to make the robot walk.

Figure 5:
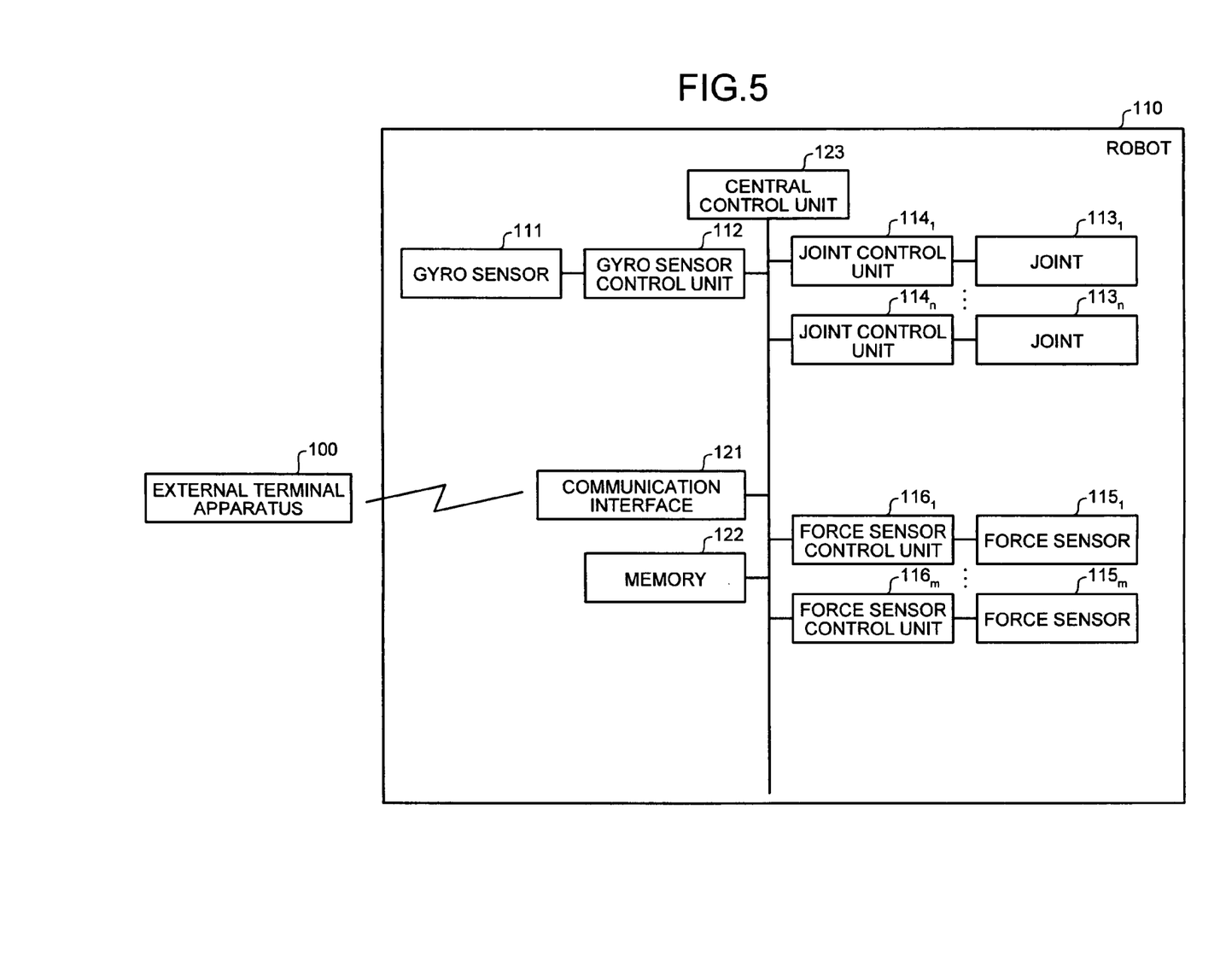
FIG. 5 is a functional block diagram of a robot control system according to the present embodiment.

FIG. 5 is a functional block diagram of a robot control system according to the present embodiment. The robot control system includes an external terminal apparatus 100 and a robot 110.

The external terminal apparatus 100 is a personal computer or the like operated by an operator who administers the motions of the robot 110. The external terminal apparatus 100 performs communication, which includes reception and transmission of various types of information, with the robot 110.

The external terminal apparatus 100 sends to the robot 110 the predetermined frame information of the robot 110 and/or the instruction information meant for the robot 110, and receives from the robot 110 the information on the condition (posture, velocity, or the like) of the robot 110. The information received from the robot 110 is displayed on a display device (not illustrated).

The robot 110 is assumed to be a two-legged humanoid robot. The robot 110 includes a gyro sensor 111, a gyro sensor control unit 112, joints $113_1$ to $113_n$, joint control units $114_1$ to $114_n$ (n being a natural number), force sensors $115_1$ to $115_m$ (m being a natural number), force sensor control units $116_1$ to $116_m$, a communication interface 121, a memory 122, and a central control unit 123.

The gyro sensor 111 corresponds to the gyro sensor 60 illustrated in FIG. 3. The gyro sensor 111 is installed in the body 20 of the robot 110 and measures the rotation angles of the body 20 in the sideways (rolling) direction and the front-back (pitching) direction. The gyro sensor control unit 112 controls the functions of the gyro sensor 111 and sends to the central control unit 123 the information on the rotation angles obtained by the gyro sensor 111.

The joints $113_1$ to $113_n$ move various joints of the robot 110. For that, the joints $113_1$ to $113_n$ are driven by motors (not illustrated). The joints include, as illustrated in FIG. 3, the pitch waist joint 10, the right yaw hip joint 11R, the left yaw hip joint 11L, the right roll hip joint 12R, the left roll hip joint 12L, the right pitch hip joint 13R, the left pitch hip joint 13L, the right pitch knee joint 14R, the left pitch knee joint 14L, the right pitch ankle joint 15R, the left pitch ankle joint 15L, the right roll ankle joint 16R, and the left roll ankle joint 16L.

The joint control units $114_1$ to $114_n$ control the motions of the joints $113_1$ to $113_n$, respectively. Particularly, the joint control units $114_1$ to $114_n$ perform control so that the joints $113_1$ to $113_n$ rotate for a predetermined time period at a predetermined angular velocity in a predetermined angle. The rotation angle, the angular velocity, and the time period are specified by the central control unit 123.

The force sensors $115_1$ to $115_m$ are installed in the soles of the right leg and the left leg of the robot 110. The force sensors $115_1$ to $115_m$ measure the reaction force experienced from the floor surface. Meanwhile, the force sensors $115_1$ to $115_m$ have identical functions to that of the force sensors 50a to 50d illustrated in FIG. 3. The force sensor control units $116_1$ to $116_m$ respectively control the functions of the force sensors $115_1$ to $115_m$ and send to the central control unit 123 the information on the reaction force obtained by the force sensors $115_1$ to $115_m$.

The communication interface 121 performs communication, such as wireless communication and/or wire communication, with the external terminal apparatus 100.

The memory 122 is used to store a variety of information. For example, in the memory 122 is stored the information received from the external terminal apparatus 100 and/or the information sent to the external terminal apparatus 100. In addition, in the memory 122 is stored the result of various calculations performed by the central control unit 123.

The central control unit 123 controls the robot 110 in entirety. For example, based on the frame information received from the external terminal apparatus 100, the central control unit 123 calculates the start time of rotation, the angular velocity, and the rotation angle of each of the joints $113_1$ to $113_n$ while the robot 110 is in motion and sends the calculation result to the joint control units $114_1$ to $114_n$.

The central control unit 123 also receives a motion control processing request for the robot 110 that is issued by the external terminal apparatus 100 via the communication interface 121. The motion control processing request includes a stride-length change request, a walking-direction change request, or a request for performing a motion other than walking.

The central control unit 123 executes the abovementioned requests only after the posture in one of the reference frames P1, P6, and P11 is attained. While executing a request, the central control unit 123 sends to the joint control units $114_1$ to $114_n$ the information on the start time of rotation, the angular velocity, and the rotation angle of each of the joints $113_1$ to $113_n$ that corresponds to the requested motion. Since the robot 110 is standing on one leg stably in each of the reference frames P1, P6, and P11; it is advantageous to execute the abovementioned requests when the robot 110 is standing in the posture corresponding to one of the reference frames P1, P6, and P11.

Meanwhile, although it is herein assumed that the central control unit 123 calculates various parameters, it is also possible to implement a configuration in which the external terminal apparatus 100 calculates those parameters and accordingly controls the robot. While implementing such a configuration, the external terminal apparatus 100 receives the information for calculating the start time of rotation, the angular velocity, and the rotation angle from the robot 110 and then calculates the parameters based on the received information. Then, the joint control units $114_1$ to $114_n$ receive the information on the calculation result from the external terminal apparatus 100 and perform motion control processing of the robot 110 based on the received information.

Figure 6:
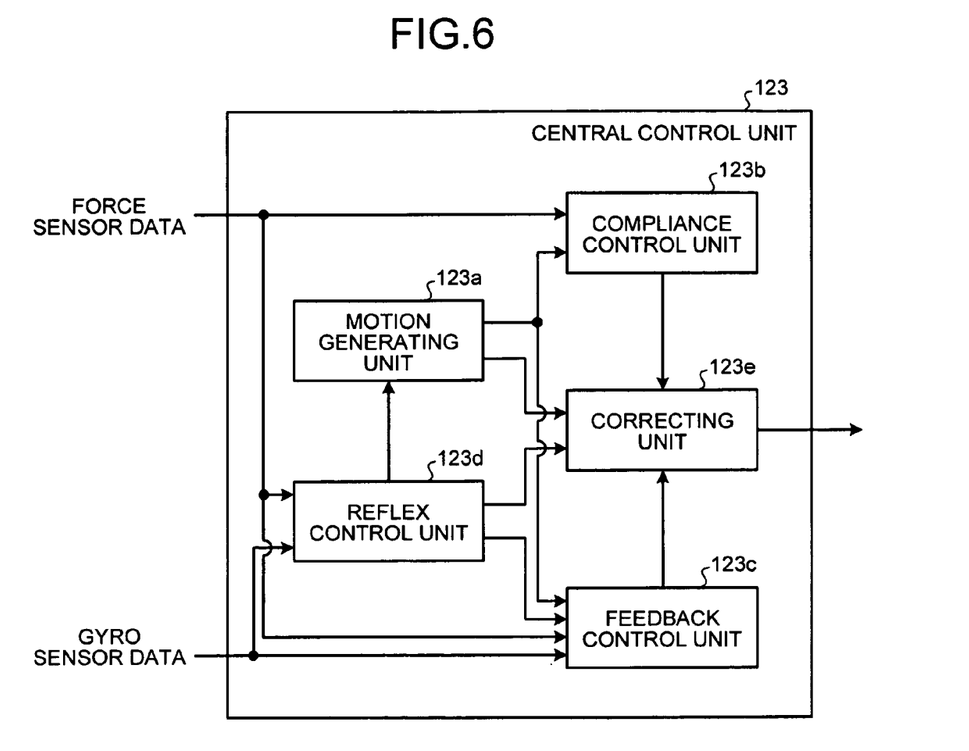
FIG. 6 is a functional block diagram of a configuration of a central control unit.

Given below is the detailed description of the robot control processing performed by the central control unit 123. FIG. 6 is a functional block diagram of a configuration of the central control unit 123. As illustrated in FIG. 6, the central control unit 123 includes a motion generating unit 123a, a compliance control unit 123b, a feedback control unit 123c, a reflex control unit 123d, and a correcting unit 123e.

The motion generating unit 123a is a processing unit that, based on the frame information received from the external terminal apparatus 100 via the communication interface 121, calculates the start time of rotation, the angular velocity, and the rotation angle of each of the joints $113_1$ to $113_n$ while the robot 110 is in motion and then outputs that information to the correcting unit 123e. Besides, the motion generating unit 123a sends, to the compliance control unit 123b and the feedback control unit 123c, phase information that indicates the phase from among a rolling phase, a lifting phase, and a landing phase in which the robot 110 currently is.

The compliance control unit 123b is a processing unit that, based on the force sensor data measured by the force sensors $115_1$ to $115_m$ and the phase information received from the motion generating unit 123a, performs the compliance control processing of the landing motion or the like. The compliance control unit 123b also calculates a compliance control amount and outputs it to the correcting unit 123e.

The feedback control unit 123c is a processing unit that performs gyro feedback control processing based on gyro sensor data measured by the gyro sensor 111 and performs ZMP feedback control processing based on the force sensor data measured by the force sensors $115_1$ to $115_m$. The feedback control unit 123c also calculates a feedback control amount and outputs it to the correcting unit 123e.

The reflex control unit 123d is a processing unit that detects an external force acting on the upper body of the robot 110 and performs reflex control processing. The reflex control unit 123d makes use of the force sensor data measured by the force sensors $115_1$ to $115_m$ and the gyro sensor data measured by the gyro sensor 111 and performs the reflex control processing so that the robot 110 remains stable against the external force.

The correcting unit 123e is a processing unit that makes use of the output of the compliance control unit 123b, the feedback control unit 123c, and the reflex control unit 123d, and corrects the start time of rotation, the angular velocity, and the rotation angle calculated with respect to each of the joints $113_1$ to $113_n$ by the motion generating unit 123a. The correcting unit 123e also outputs commands for the motor of each of the joints $113_1$ to $113_n$.

Given below are the details regarding the reflex control processing performed by the reflex control unit 123d. Herein, the external force acting on the robot 110 is assumed to be a strong force that the robot 110 experiences by getting pushed from outside.

The external force experienced by the robot 110 is detected using a gyro index. Herein, if the value detected by the gyro sensor 111 is assumed to be (Gyro$_x$, Gyro$_y$) and the width/length of the sole 40 is assumed to be v, then the gyro index is calculated as given below in Equation (1).

$$\text{Gyro index} = \sqrt{(\text{Gyro}_x)^2 + (v\text{Gyro}_y)^2} \qquad (1)$$

When the value of the gyro index exceeds a predetermined threshold value, the reflex control unit 123d stops the walking motion of the robot 110 and performs the reflex control processing on the basis of the position of the ZMP, the amount of the change in the position of the ZMP, and whether the robot 110 is standing on both legs or on a single leg. The predetermined threshold value is determined from a gyro feedback stability margin. That is, the predetermined threshold value is the value of the gyro index which corresponds to the time when the robot 110 can no more be maintained stable by performing the gyro feedback control processing.

Figure 7:
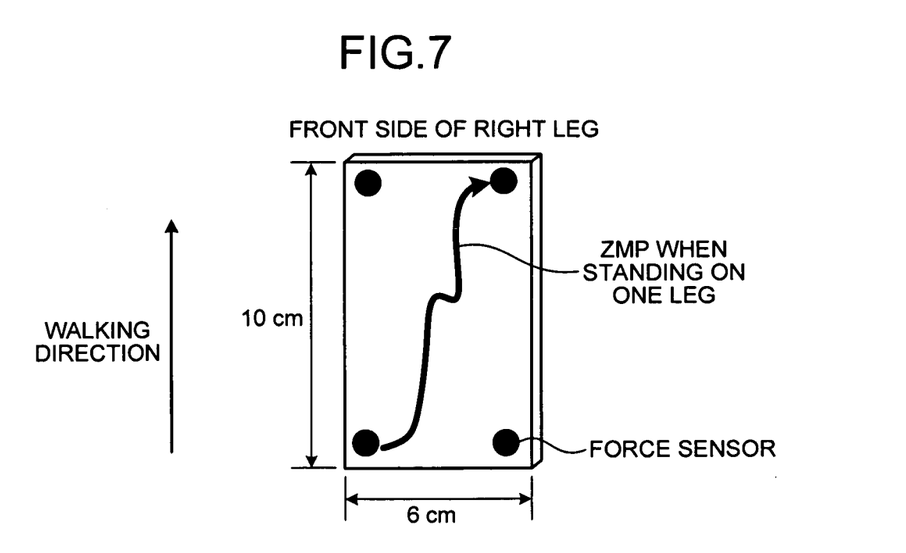
FIG. 7 is a schematic diagram of ZMP trajectory.

In FIG. 7, a thick arrow illustrates the normal ZMP trajectory when the robot 110 is standing only on the right leg during walking. If the robot 110 experiences an external force on the upper body thereof during walking, then the ZMP deviates from the normal trajectory in the direction from which the external force is experienced. Based on whether the ZMP is within a stability domain, whether the ZMP is maintainable within the stability domain, and whether the robot 110 is standing on both legs or on a single leg; the reflex control unit 123d performs the reflex control processing. Herein, the stability domain is assumed to be the quadrangle formed by the sole 40.

Figure 8:
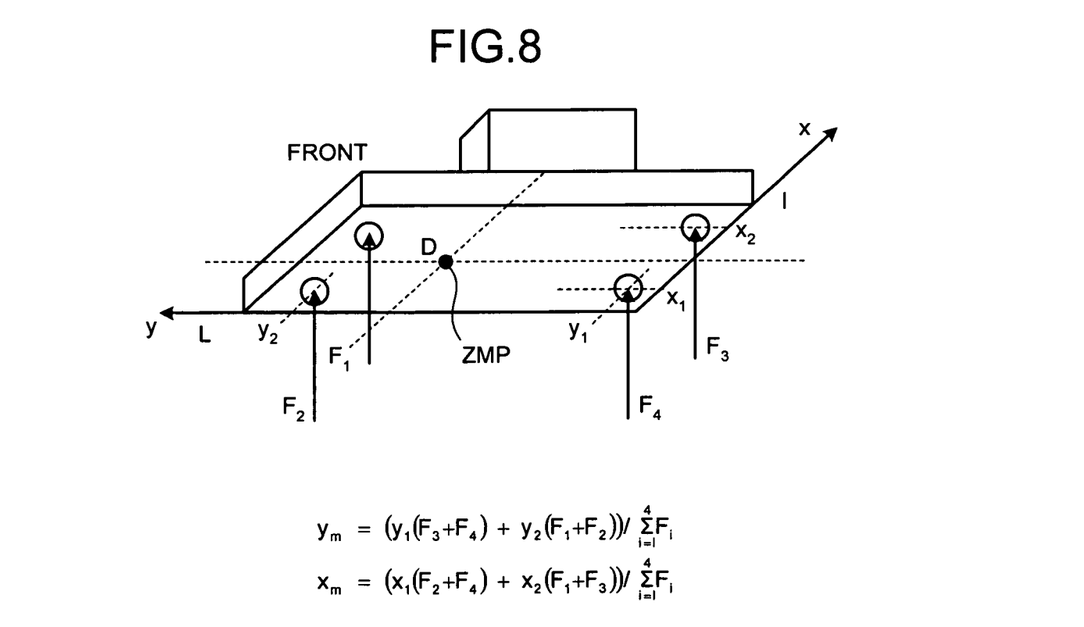
FIG. 8 is a schematic diagram for explaining a method of calculating the ZMP implemented by a reflex control unit.

To determine the position of the ZMP and the amount of positional change of the ZMP, the reflex control unit 123d calculates the ZMP using the force sensor data. FIG. 8 is a schematic diagram for explaining a method of calculating the ZMP performed by the reflex control unit 123d. As illustrated in FIG. 8, the reflex control unit 123d calculates ZMP($x_m$, $y_m$) using four force sensor data $F_1$ to $F_4$ and the coordinates at which the force sensors are installed. Besides, using ZMP($x_m$, $y_m$), the reflex control unit 123d calculates the amount of positional change of the ZMP. Moreover, based on the magnitude of the force detected at the soles 40 of the right leg and the left leg, the reflex control unit 123d determines whether the robot 110 is standing on both legs or on a single leg.

Figure 9:
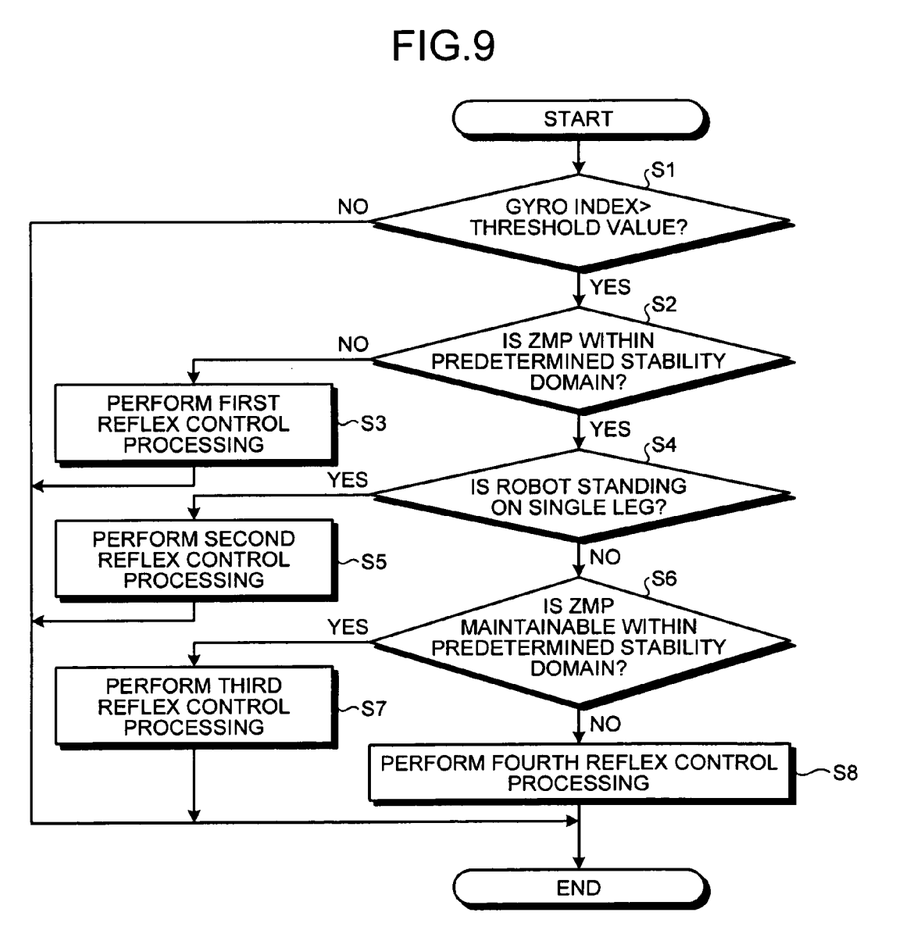
FIG. 9 is a flowchart for explaining the sequence of operations in the reflex control processing performed by the reflex control unit.

Given below is the sequence of operations in the reflex control processing performed by the reflex control unit 123d. FIG. 9 is a flowchart for explaining the sequence of operations in the reflex control processing performed by the reflex control unit 123d. The reflex control processing is started at a fixed time interval.

As illustrated in FIG. 9, during the reflex control processing; the reflex control unit 123d first determines whether the gyro index has exceeded a predetermined threshold value (Step S1) and, if the gyro index has not exceeded the predetermined threshold value, finishes the processing because there is no need to perform the reflex control processing.

On the other hand, if the gyro index has exceeded the predetermined threshold value, then the reflex control unit 123d determines whether the ZMP is within a predetermined stability domain (Step S2). If the ZMP is not within the predetermined stability domain, then the reflex control unit 123d performs a first reflex control processing as the reflex control processing meant to prevent the robot 110 from falling down (Step S3). The details regarding the first reflex control processing are given later.

On the other hand, if the ZMP is within the predetermined stability domain; then the reflex control unit 123d determines whether the robot 110 is standing on a single leg (Step S4) and, if the robot 110 is standing on a single leg, performs a second reflex control processing as the reflex control processing meant to maintain the robot 110 stable (Step S5). The details regarding the second reflex control processing are given later.

On the other hand, if the robot 110 is standing on both legs, then the reflex control unit 123d determines whether the ZMP is maintainable within the predetermined stability domain (Step S6). Whether the ZMP is maintainable within the predetermined stability domain is determined by checking whether the amount of positional change of the ZMP is equal to or under a predetermined threshold value.

If the ZMP is maintainable within the predetermined stability domain, then the reflex control unit 123d performs a third reflex control processing as the reflex control processing meant to maintain the robot 110 stable (Step S7). However, if the ZMP is not maintainable within the predetermined stability domain, then the reflex control unit 123d performs a fourth reflex control processing as the reflex control processing meant to maintain the robot 110 stable (Step S8). The details regarding the third reflex control processing and the fourth reflex control processing are given later.

In this way, by performing the reflex control processing on the basis of the position of the ZMP, the amount of positional change of the ZMP, and whether the robot 110 is standing on both legs or on a single leg; the robot 110 can be prevented from falling down and can be maintained stable against the external force acting on the upper body thereof.

Figure 10:
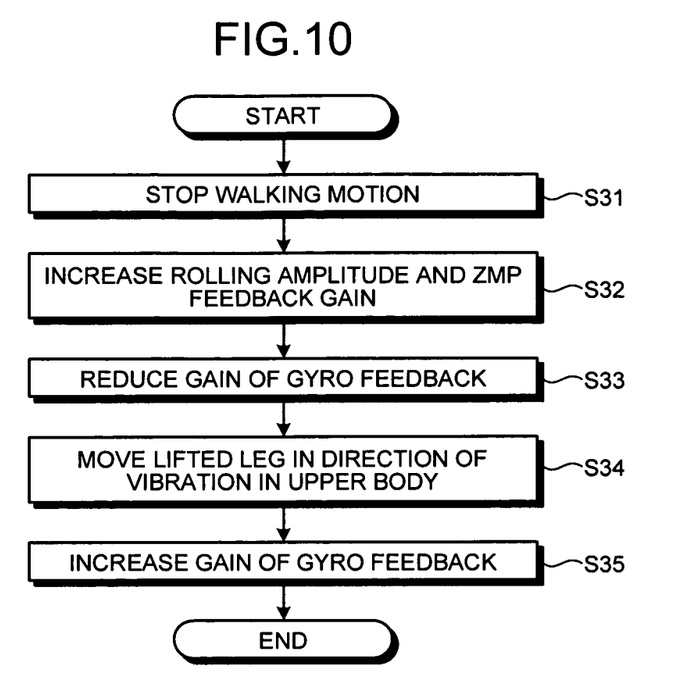
FIG. 10 is a flowchart for explaining the sequence of operations in a first reflex control processing.

Given below is the description about the sequence of operations in the first reflex control processing. FIG. 10 is a flowchart for explaining the sequence of operations in the first reflex control processing. As illustrated in FIG. 10, in the first reflex control processing, the reflex control unit 123d stops the walking motion of the robot 110 (Step S31) and increases the rolling amplitude and the ZMP feedback gain (Step S32). Meanwhile, the ZMP feedback control processing is performed to control the ankle joints and the waist joint or the hip joint.

Then, the reflex control unit 123d reduces the gain of the gyro feedback to curb vibration of the upper body (Step S33) and moves the lifted leg in the direction in which the upper body is vibrating (Step S34). The direction in which the upper body is vibrating is calculated from the ZMP trajectory. Subsequently, in the final posture, the reflex control unit 123d increases the gain of the gyro feedback (Step S35).

In this way, when the ZMP is not within the predetermined stability domain; the reflex control unit 123d increases the rolling amplitude and the ZMP feedback gain, and moves the lifted leg in the direction in which the upper body is vibrating. That prevents the robot 110 from falling down.

Figure 11:
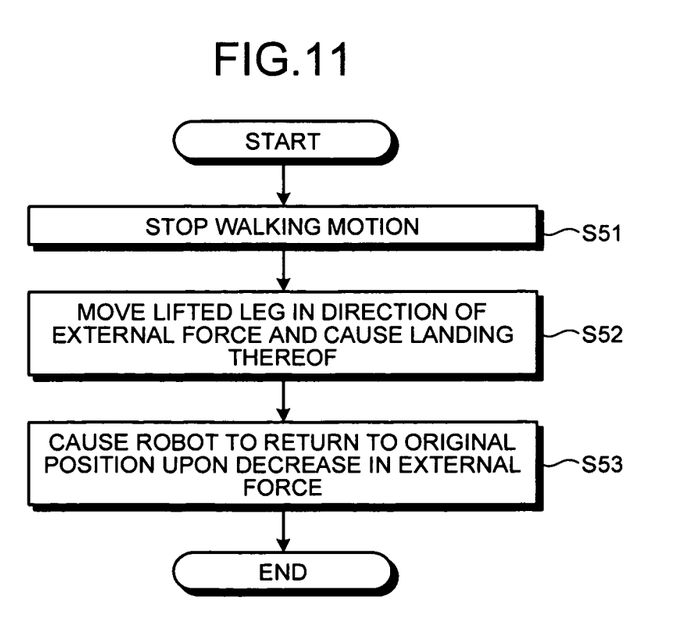
FIG. 11 is a flowchart for explaining the sequence of operations in a second reflex control processing.

Given below is the description about the sequence of operations in the second reflex control processing. FIG. 11 is a flowchart for explaining the sequence of operations in the second reflex control processing. As illustrated in FIG. 11, in the second reflex control processing, the reflex control unit 123d stops the walking motion of the robot 110 (Step S51), and moves the lifted leg in the direction of the external force and causes it to land on the floor surface (Step S52).

The distance for which the lifted leg is moved is proportional to the distance between the present location of the ZMP and the center of the stability domain. Subsequently, when the external force decreases, the reflex control unit 123d causes the robot 110 to return to the original posture (Step S53).

In this way, when the robot 110 is standing on a single leg; the reflex control unit 123d moves the lifted leg in the direction of the external force by a distance proportional to the distance between the present location of the ZMP and the center of the stability domain and causes the moved leg to land on the floor surface. That ensures stability of the robot 110.

Figure 12:
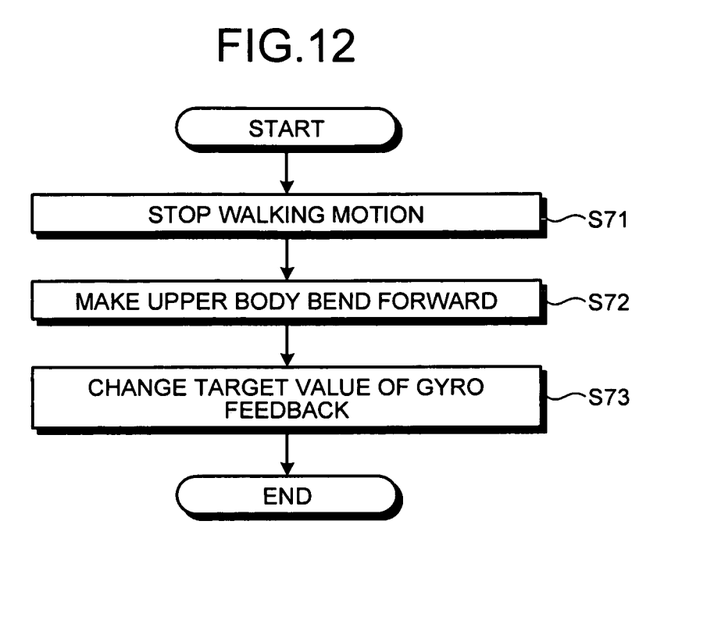
FIG. 12 is a flowchart for explaining the sequence of operations in a third reflex control processing.

Given below is the description about the sequence of operations in the third reflex control processing. FIG. 12 is a flowchart for explaining the sequence of operations in the third reflex control processing. As illustrated in FIG. 12, in the third reflex control processing, the reflex control unit 123d stops the walking motion of the robot 110 while continuing to perform the compliance control processing and the gyro feedback control processing that is performed to maintain stability of the upper body (Step S71).

Then, the reflex control unit 123d bends the upper body forward by moving the waist joint or the hip joint and the ankle joint (Step S72). The degree of forward bending depends on the external force acting on the upper body. Subsequently, based on the angle of forward bending, the reflex control unit 123d changes the target value of the gyro feedback that is performed to ensure that the upper body does not vibrate (Step S73).

In this way, when the robot 110 is standing on both legs, it can be maintained stable by making it bend forward.

Figure 13:
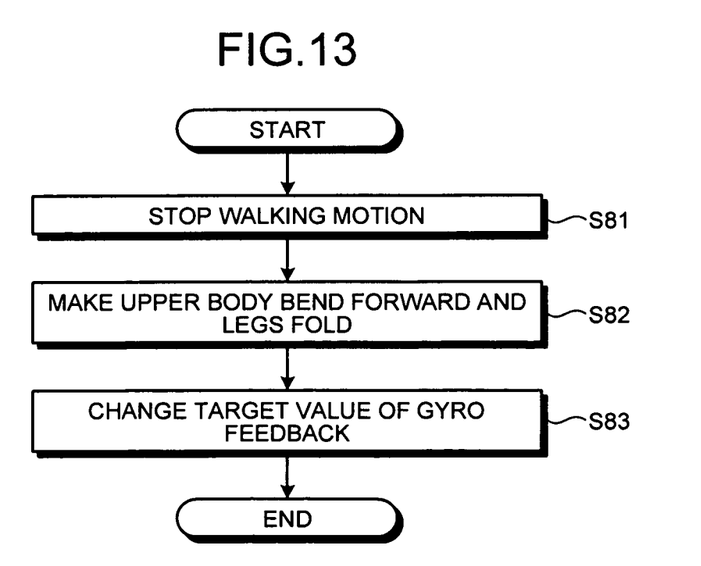
FIG. 13 is a flowchart for explaining the sequence of operations in a fourth reflex control processing.

Given below is the description about the sequence of operations in the fourth reflex control processing. FIG. 13 is a flowchart for explaining the sequence of operations in the fourth reflex control processing. As illustrated in FIG. 13, in the fourth reflex control processing, the reflex control unit 123d stops the walking motion of the robot 110 while continuing to perform the compliance control processing and the gyro feedback control processing that is used in maintaining stability of the upper body (Step S81).

Then, the reflex control unit 123d bends the upper body forward by moving the waist joint or the hip joint and the ankle joint, and lowers the center of gravity by folding the legs (Step S82). The degree of forward bending and leg folding depends on the external force acting on the upper body. Subsequently, based on the angle of forward bending, the reflex control unit 123d changes the target value of the gyro feedback that is performed to ensure that the upper body does not vibrate (Step S83).

In this way, if the ZMP is not maintainable within the predetermined stability domain while the robot is standing on both legs, then the upper body can be made to bend forward and the legs can be made to fold to lower the center of gravity. That ensures stability of the robot 110.

As described above, in the present embodiment, when an external force acts on the upper body of the robot 110; the reflex control unit 123d makes use of the gyro index and determines whether to perform the reflex control processing or not. On determining to perform the reflex control processing, the reflex control unit 123d performs the appropriate reflex control processing on the basis of the position of the ZMP, the amount of positional change of the ZMP, and whether the robot 110 is standing on both legs or on a single leg. Because of that, the robot 110 can be prevented from falling down and can be maintained stable.

In the present embodiment, the description is given regarding the robot control apparatus. However, by implementing the configuration of the robot control apparatus with software, a robot control program having identical functions can be created. Given below is the description of a configuration of a computer that executes the robot control program.

Figure 14:
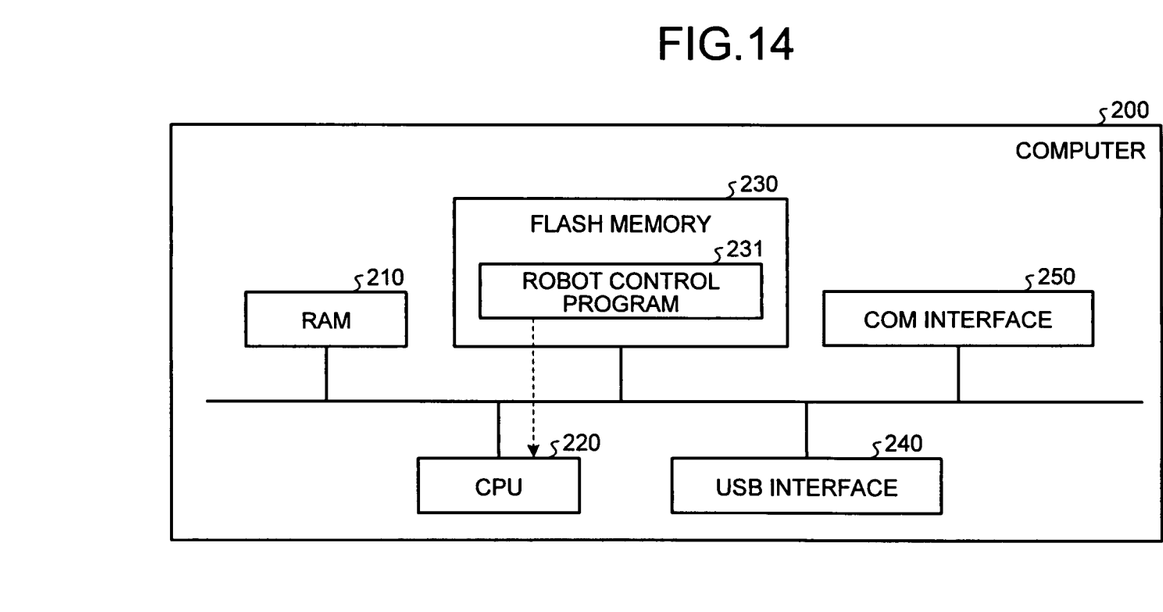
FIG. 14 is a functional block diagram of a configuration of a computer that executes a robot control program according to the present embodiment.

FIG. 14 is a functional block diagram of a configuration of a computer that executes the robot control program according to the present embodiment. As illustrated in FIG. 14, a computer 200 includes a random access memory (RAM) 210, a central processing unit (CPU) 220, a flash memory 230, a universal serial bus (USB) interface 240, and a component object model (COM) interface 250.

The RAM 210 is a memory that is used to store programs or intermediate processing results of programs and that corresponds to the memory 122 illustrated in FIG. 5. The CPU 220 is a central processing unit that reads programs from the RAM 210 and executes them. The flash memory 230 is a nonvolatile memory used to store programs or data. The USB interface 240 is an interface that is used in connecting the computer 200 to joints or sensors. The COM interface 250 is an interface that is used in communication with the external terminal apparatus 100 and that corresponds to the communication interface 121 illustrated in FIG. 5. A robot control program 231 that is to be executed in the computer 200 is read from the flash memory 230 and executed by the CPU 220.

According to an embodiment of the invention, it is possible to properly detect an external force acting on the upper body of a robot and accordingly perform a reflex control processing.

According to an embodiment of the invention, it is also possible to deal with a strong external force.

According to an embodiment of the invention, it is possible to continue the walking motion if the external force is not strong.

According to an embodiment of the invention, it is possible to maintain the robot stable.

According to an embodiment of the invention, a robot can be prevented from falling down and can be maintained stable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A robot control apparatus for controlling robot walking comprising:
   a walking motion control unit that, based on a plurality of postures corresponding to different points of time and at least including a reference posture when a robot is independently standing without falling down, generates control information and controls the robot so that the robot performs a predetermined walking motion; and
   a reflex control unit that determines whether, during the control performed by the walking motion control unit, a value of a gyro index is larger than a predetermined threshold value and, when the value of the gyro index is larger than the predetermined threshold value, performs a reflex control processing by determining whether a ZMP is within a predetermined stability domain and, when the ZMP is not within the predetermined stability domain, stopping the walking motion, increasing a rolling amplitude and a ZMP feedback gain, and moving a lifted leg in a direction in which an upper body is vibrating due to an external force.

2. A robot control apparatus for controlling robot walking comprising:
   a walking motion control unit that, based on a plurality of postures corresponding to different points of time and at least including a reference posture when a robot is independently standing without falling down, generates control information and controls the robot so that the robot performs a predetermined walking motion; and
   a reflex control unit that determines whether, during the control performed by the walking motion control unit, a value of a gyro index is larger than a predetermined threshold value and, when the value of the gyro index is larger than the predetermined threshold value, performs a reflex control processing by determining whether a ZMP is within a predetermined stability domain and, when the ZMP is within the predetermined stability domain, determining whether the robot is standing on a single leg, and when the robot is standing on a single leg, stopping the walking motion, moving a lifted leg in a direction of an external force and causing the lifted leg to land, and causing the robot to return to an original posture upon a decrease in the external force.

3. A robot control apparatus for controlling robot walking comprising:
   a walking motion control unit that, based on a plurality of postures corresponding to different points of time and at least including a reference posture when a robot is independently standing without falling down, generates control information and controls the robot so that the robot performs a predetermined walking motion; and
   a reflex control unit that determines whether, during the control performed by the walking motion control unit, a value of a gyro index is larger than a predetermined threshold value and, when the value of the gyro index is larger than the predetermined threshold value, performs a reflex control processing by determining whether a ZMP is within a predetermined stability domain and, when the ZMP is within the predetermined stability domain, determining whether the robot is standing on a single leg, and when the robot is standing on both legs, determining whether the ZMP is maintainable within the predetermined stability domain, and when the ZMP is maintainable within the predetermined stability domain, stopping the walking motion, making an upper body bend forward, and changing a target value of gyro feedback according to an amount of forward bending.

4. A robot control apparatus for controlling robot walking comprising:
   a walking motion control unit that, based on a plurality of postures corresponding to different points of time and at least including a reference posture when a robot is independently standing without falling down, generates control information and controls the robot so that the robot performs a predetermined walking motion; and
   a reflex control unit that determines whether, during the control performed by the walking motion control unit, a value of a gyro index is larger than a predetermined threshold value and, when the value of the gyro index is larger than the predetermined threshold value, performs a reflex control processing by determining whether a ZMP is within a predetermined stability domain and, when the ZMP is within the predetermined stability domain, determining whether the robot is standing on a single leg, and when the robot is standing on both legs, determining whether the ZMP is maintainable within the predetermined stability domain, and when the ZMP is not maintainable within the predetermined stability domain, stopping the walking motion, making an upper body bend forward and making legs fold, and changing a target value of gyro feedback according to an amount of forward bending.

5. A robot control method for controlling robot walking comprising:
  generating control information, based on a plurality of postures corresponding to different points of time and at least including a reference posture when a robot is independently standing without falling down, and controlling the robot so that the robot performs a predetermined walking motion; and
  determining whether a value of a gyro index is larger than a predetermined threshold value, during the controlling of the robot, and, when the value of the gyro index is larger than the predetermined threshold value, performs a reflex control processing by determining whether a ZMP is within a predetermined stability domain and, when the ZMP is not within the predetermined stability domain, stopping the walking motion, increasing a rolling amplitude and a ZMP feedback gain, and moving a lifted leg in a direction in which an upper body is vibrating due to an external force.

6. A computer readable storage medium having stored therein a robot control program for controlling robot walking, the robot control program causing a computer to execute a process comprising:
  generating control information, based on a plurality of postures corresponding to different points of time and at least including a reference posture when a robot is independently standing without falling down, and controlling the robot so that the robot performs a predetermined walking motion; and
  determining whether a value of a gyro index is larger than a predetermined threshold value, during the controlling of the robot, and, when the value of the gyro index is larger than the predetermined threshold value, performs a reflex control processing by determining whether a ZMP is within a predetermined stability domain and, when the ZMP is not within the predetermined stability domain, stopping the walking motion, increasing a rolling amplitude and a ZMP feedback gain, and moving a lifted leg in a direction in which an upper body is vibrating due to an external force.

* * * * *